United States Patent Office 3,354,994
Patented Nov. 28, 1967

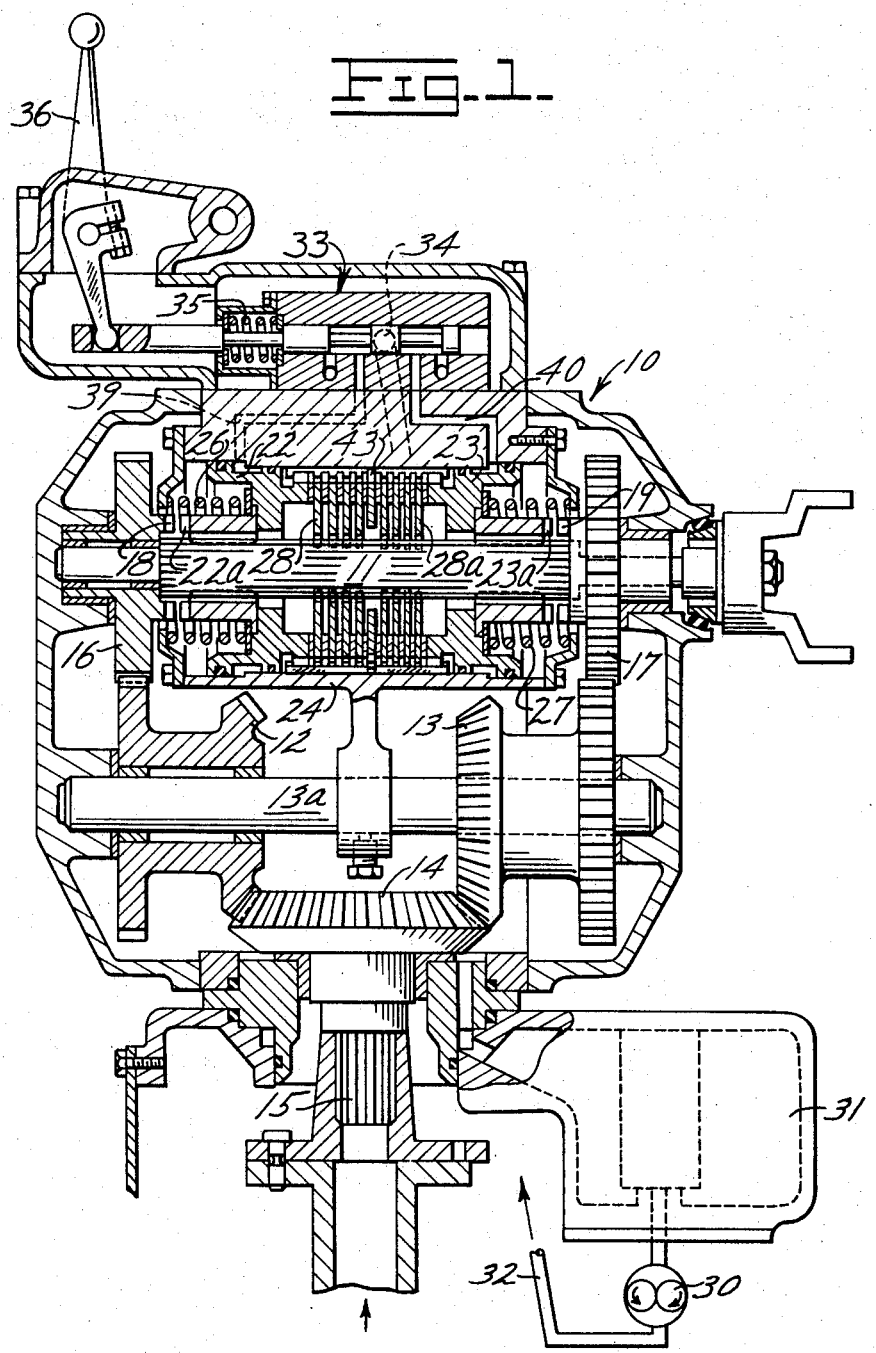

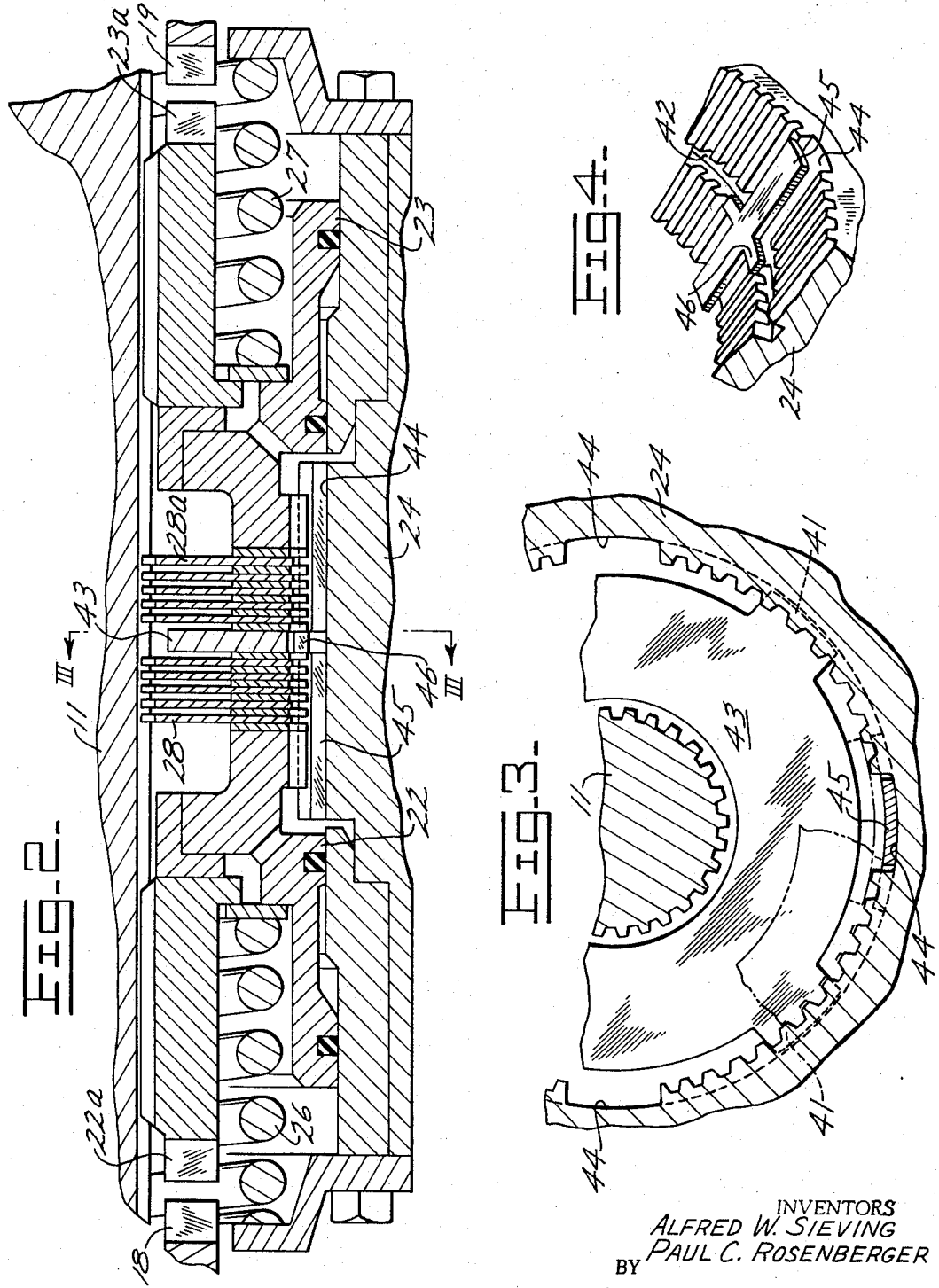

3,354,994
TRANSMISSION LOCKING MEANS
Alfred W. Sieving and Paul C. Rosenberger, Decatur, Ill., assignors to Caterpillar Tractor Co., Peoria, Ill., a corporation of California
Filed Feb. 1, 1966, Ser. No. 524,073
3 Claims. (Cl. 192—4)

This invention relates to means for locking the driven shaft of a transmission against rotation during engagement of clutch means through which the shaft is driven.

The invention is applicable to various kinds of transmissions but is disclosed herein as applied to a forward-reverse transmission of the kind commonly used in motor graders for adjusting the various components thereof. Such a transmission is disclosed in our assignee's copending application of Johnson and Winters for "Transmission Lock," Ser. No. 430,064, now Patent No. 3,321,054. In the transmission disclosed in said application, a disc-type brake is normally applied by spring pressure for preventing rotation of the driven shaft. When it is desired to rotate the shaft either in a forward or reverse direction, a clutch is engaged and the brake is automatically disengaged to permit driving of the shaft for the purpose of adjusting one of the components of the motor grader. With such a construction, there is a possibility of the brake being released just prior to engagement of the clutch with the result that the driven shaft is free to rotate and this permits undesired adjustment of one of the machine components as by gravity or by force imparted due to its engagement with the earth.

It is the object of the present invention to provide a transmission locking means for locking the output shaft in a manner to prohibit rotation thereof by external forces.

The above, and further and more specific objects of the invention and the manner in which they are carried into practice are made apparent in the following specification by reference to the accompanying drawings.

In the drawings:

FIG. 1 is a central vertical sectional view through a transmission and control valve therefor and illustrating the locking means of the present invention;

FIG. 2 is an enlarged fragmentary view illustrating the same locking means;

FIG. 3 is a fragmentary sectional view taken on the line III—III of FIG. 2; and

FIG. 4 is a fragmentary perspective view illustrating a part of the locking means.

The transmission disclosed in the drawing is, with the exception of the improved locking means, substantially the same as that disclosed in the copending application referred to above. It is contained in a housing, generally indicated at 10, within which is mounted a driven shaft 11 extending outwardly through one side of the housing where in practice it is connected with some part to be controlled. Such a part, for example, may be a motor grader scraper blade or other controlled member on a road grading machine. Mechanism, not shown, is employed for raising or otherwise adjusting the blade upon rotation of the shaft 11 in one direction and reversing the adjusting operation upon rotation of the shaft in the opposite direction. Rotary movement is imparted to the shaft 11 through either one of the pairs of bevel gears 12 and 13 rotatable on a counter shaft 13a. The gears 12 and 13 are rotated in opposite directions by engagement with a bevel gear 14 carried on a shaft 15 connected through mechanism (not shown) with a suitable power takeoff shaft of the main engine of the road grading machine.

The bevel gears 12 and 13 being thus driven in opposite directions may be selectively connected with the driven shaft 11 for imparting motion in either direction thereto. The gears 12 and 13 drive gears 16 and 17, respectively, and these gears are provided with toothed clutch faces 18 and 19. Two pistons 22 and 23 are slidable axially with respect to shaft 11 in a cylindrical housing 24 which surrounds the shaft and they carry toothed faces 22a and 23a for engagement with the clutch faces 18 and 19 of the gears 16 and 17. Springs 26 and 27 normally urge the clutch piston 22 and 23 away from the position of clutch engagement and into a brake engaging position where the pistons compress stacks of brake discs shown at 28 and 28a in which stacks alternate discs are splined to the shaft 11 and to the interior of the cylinder 24.

Upon adjustment of either of piston toward clutch engaging position, it is first moved away from its respective brake 28 or 28a which holds the driven shaft against rotation and then immediately effects engagement of the clutch teeth. The pistons 22 and 23 are fluid actuated as by hydraulic fluid under pressure from a pump 30 withdrawing fluid from a reservoir 31 and directing it through a line 32 to a spool valve shown at 33 above the housing and having an inlet 34 normally closed by the spool as in the position illustrated. The valve is spring centered as by a spring 35 and manually actuated by a lever 36 to direct fluid selectively through passages 39 or 40 to a chamber in either one of the pistons 22 or 23 for effecting clutch engagement preceded by brake release in the manner just described.

In existing transmissions as in the one disclosed in the copending application referred to above, a single set of brake discs was employed instead of two stacks 28 and 28a disclosed herein. Consequently when either piston 22 or 23 was moved away from the brake, the entire brake was released and the driven shaft 11 was free to rotate for that brief period before the clutch teeth were engaged. Consequently when the operator manipulated the valve lever 36 very lightly as for making a small adjustment, control was often lost permitting maladjustment of the blade or other part being controlled.

In the present invention, the brake means has been separated to provide two separate brakes normally engaged by the springs 26 and 27 to prevent rotation of the driven shaft. Either one of the springs 26 and 27 has sufficient force to hold one of the brakes 28 or 28a in engagement to prevent undesired rotation of the driven shaft. However the force of a single spring is such that it may be overcome by driving power transmitted through the opposite clutch and adjustment of the machine component is made by simply causing momentary dragging of the brake which remains in engagement. Since adjustments are infrequent and take only a short period of time, this dragging of the brakes is not detrimental. The manner in which the two brakes are provided in the space previously occupied by one is shown in FIGS. 2, 3 and 4 wherein a disc or backup plate 43 is shown as disposed between the two brakes 28 and 28a and held against axial movement by four tongues, two of which are shown at 41 in FIG. 3 as projecting into a groove, best shown at 42 in FIG. 4. In order to insert the plate 43, the splines which engage the outer peripheries of the brake discs are cut away to form channels shown at 44 in FIGS. 3 and 4 and these channels receive the tongues 41. When the plate 43 slides through these channels to the groove 42, it is indexed so that the tongues no longer register with the channels. A key 45 is then fitted into one of the channels 44 and has ears 46 which extend into the groove 42 and prevent rotation of the plate 43 to a point where the tongues 41 thereon align with the channels. Assembly into place of the alternate brake discs which are splined to the cylinder 24 retains the key 45 in place.

We claim:
1. In a forward-reverse transmission having an output shaft, forward and reverse drive gearing, two clutches concentric with the shaft to selectively engage the forward and reverse gearing therewith and brake means for the shaft disposed between the clutches, the improvement which comprises said brake means being in the form of two separate brakes, and means operable upon engagement of either clutch to release only one of said brakes.

2. The combination of claim 1 in which either of the two brakes can be overcome and will slip under the force of the drive means.

3. The combination of claim 1 in which the brakes are in the form of stacks of axially compressible discs which embrace the output shaft, and a plate interposed between the stacks and retained against longitudinal movement to react the force of compressing the stacks to apply the brakes.

References Cited

UNITED STATES PATENTS 3,321,054   5/1967   Johnson et al. _____ 74—378

OTHER REFERENCES

German printed application B 34,725, Apr. 1956.

DONLEY J. STOCKING, *Primary Examiner.*

H. S. LAYTON, *Assistant Examiner.*